US009967801B2

(12) United States Patent
Byun et al.

(10) Patent No.: US 9,967,801 B2
(45) Date of Patent: May 8, 2018

(54) METHOD AND APPARATUS FOR RECEIVING AUTHORIZATION INFORMATION ON NETWORK SLICE

(71) Applicant: LG ELECTRONICS INC., Seoul (KR)

(72) Inventors: Daewook Byun, Seoul (KR); Jian Xu, Seoul (KR); Seokjung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/619,306

(22) Filed: Jun. 9, 2017

(65) Prior Publication Data

US 2017/0359768 A1 Dec. 14, 2017

Related U.S. Application Data

(60) Provisional application No. 62/348,182, filed on Jun. 10, 2016, provisional application No. 62/349,614, filed on Jun. 13, 2016.

(51) Int. Cl.
| | |
|---|---|
| *G01R 31/08* | (2006.01) |
| *H04W 48/04* | (2009.01) |
| *H04W 72/04* | (2009.01) |
| *H04W 8/02* | (2009.01) |
| *H04W 88/08* | (2009.01) |
| *H04W 88/02* | (2009.01) |

(52) U.S. Cl.
CPC ............. *H04W 48/04* (2013.01); *H04W 8/02* (2013.01); *H04W 72/0406* (2013.01); *H04W 88/02* (2013.01); *H04W 88/08* (2013.01)

(58) Field of Classification Search
USPC ............... 455/450, 436, 414.1; 370/254, 331
See application file for complete search history.

(56) References Cited

U.S. PATENT DOCUMENTS

| | | | | |
|---|---|---|---|---|
| 2015/0078173 | A1* | 3/2015 | Javed .................... | H04W 24/08 370/241 |
| 2016/0352734 | A1* | 12/2016 | Senarath ............. | H04L 63/0892 |
| 2017/0142591 | A1* | 5/2017 | Vrzic ..................... | H04W 24/08 |
| 2017/0164212 | A1* | 6/2017 | Opsenica ............. | H04W 24/02 |
| 2017/0231020 | A1* | 8/2017 | Tomici ................ | H04W 76/021 |

OTHER PUBLICATIONS

3rd Generation Partnership Project, "Technical Specification Group Radio Access Network; Evolved Universal Terrestrial Radio Access Network (E-UTRAN); S1 Application Protocol (S1AP) (Release 12)", Section 9.2.3.4 of 3GPP TS 36.413 V12.6.0, Jun. 2015, 3 pages.

* cited by examiner

*Primary Examiner* — David Q Nguyen
(74) *Attorney, Agent, or Firm* — Lee Hong Degerman Kang Waimey

(57) ABSTRACT

Proposed are a method for receiving, by a base station (BS), authorization information on a network slice in a wireless communication system, and an apparatus supporting the same. The method may include: receiving an attach request from a user equipment (UE); selecting a common control plane function (C-CPF) corresponding to a particular network slice based on the attach request; transmitting the received attach request to the selected C-CPF; and receiving authorization information, which indicates whether the UE is authorized to use the particular network slice, from the selected C-CPF.

15 Claims, 12 Drawing Sheets

METHOD AND APPARATUS FOR RECEIVING AUTHORIZATION INFORMATION ON NETWORK SLICE

CROSS-REFERENCE TO RELATED APPLICATIONS

Pursuant to 35 U.S.C. § 119 (e), this application claims the benefit of U.S. Provisional Application Nos. 62/348,182, filed on Jun. 10, 2016 and 62/349,614, filed on Jun. 13, 2016, the contents of which are all hereby incorporated by reference herein in their entirety.

BACKGROUND OF THE INVENTION

Field of the Invention

The present invention relates to a wireless communication system, and more particularly, to a method for a base station to receive authorization information on a network slice requested by a user equipment, and an apparatus supporting the same.

Related Art

In order to meet the demand for wireless data traffic, which has been increasing since the commercialization of a fourth-generation (4G) communication system, efforts are being made to develop an improved fifth-generation (5G) communication system or pre-5G communication system. For this reason, a 5G communication system or pre-5G communication system is referred to as a beyond-4G-network communication system or post-long-term evolution (LTE) system.

To achieve a high data transmission rate, implementing a 5G communication system in an extremely high frequency (mmWave) band (for example, a 60 GHz band) is being considered. To relieve the path loss of signals and to increase the transmission distance of signals in an extremely high frequency band, beamforming, massive multiple-input and multiple-output (massive MIMO), full dimensional MIMO (FD-MIMO), array antenna, analog beamforming, and large-scale antenna techniques are under discussion for a 5G communication system.

Further, to improve the network of the system, technical development in an evolved small cell, an advanced small cell, a cloud radio access network (cloud RAN), an ultra-dense network, device-to-device (D2D) communication, wireless backhaul, a moving network, cooperative communication, coordinated multi-points (CoMP), and interference cancellation is progressing for the 5G communication system.

In addition, an advanced coding modulation (ACM) scheme including hybrid frequency shift keying (FSK) and quadrature amplitude modulation (FQAM) and sliding window superposition coding (SWSC) and an advanced access technique including filter bank multi carrier (FBMC), non-orthogonal multiple access (NOMA), and sparse code multiple access (SCMA) are being developed in the 5G system.

In particular, network slicing that aims to enable independency and flexibility of services and network resources is introduced in order to efficiently offer various 5G convergence services.

SUMMARY OF THE INVENTION

A user equipment (UE) may request the use of a particular network slice during a mobility management (MM) attach procedure. However, according to a conventional art, a network is unable to approve or disapprove the particular network slice requested for use by the UE. Thus, it is necessary to propose a novel procedure for reporting whether the particular network slice requested by the UE is approved in the MM procedure.

According to one embodiment, there is provided a method for receiving, by a base station (BS), authorization information on a network slice in a wireless communication system. The method may include: receiving an attach request from a user equipment (UE); selecting a common control plane function (C-CPF) corresponding to a particular network slice based on the attach request; transmitting the received attach request to the selected C-CPF; and receiving authorization information, which indicates whether the UE is authorized to use the particular network slice, from the selected C-CPF.

The method may further include storing the received authorization information in UE context.

Whether the UE is authorized to use the particular network slice may be determined by the selected C-CPF. Whether the UE is authorized to use the particular network slice may be determined based on subscription data or a capability of the UE.

The C-CPF corresponding to the particular network slice may be selected by a network slice selection function (NSSF) and a control plane selection function (CPSF). The NSSF and the CPSF may be included in the BS.

The attach request may include information on a service desired by the UE. The particular network slice may be determined by an NFFS based on the information on the service desired by the UE. The particular network slice may be a network slice providing the service desired by the UE.

The method may further include receiving an indicator indicating whether the attach request is allowed from the selected C-CPF. The method may further include transmitting the indicator indicating whether the attach request is allowed to the UE.

The C-CPF may be an access and mobility function (AMF).

According to another embodiment, there is provided a BS receiving authorization information on a network slice in a wireless communication system. The BS may include: a memory; a transceiver; and a processor to connect the memory and the transceiver, wherein the processor may be configured to: control the transceiver to receive an attach request from a UE; select a C-CPF corresponding to a particular network slice based on the attach request; control the transceiver to transmit the received attach request to the selected C-CPF; and control the transceiver to receive authorization information, which indicates whether the UE is authorized to use the particular network slice, from the selected C-CPF.

A BS may identify whether a network slice requested by a UE is authorized by a common control plane function.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G communication system is an evolution of the LTE-A.

For clarity, the following description will focus on LTE-A. However, technical features of the present invention are not limited thereto.

Figure 1:
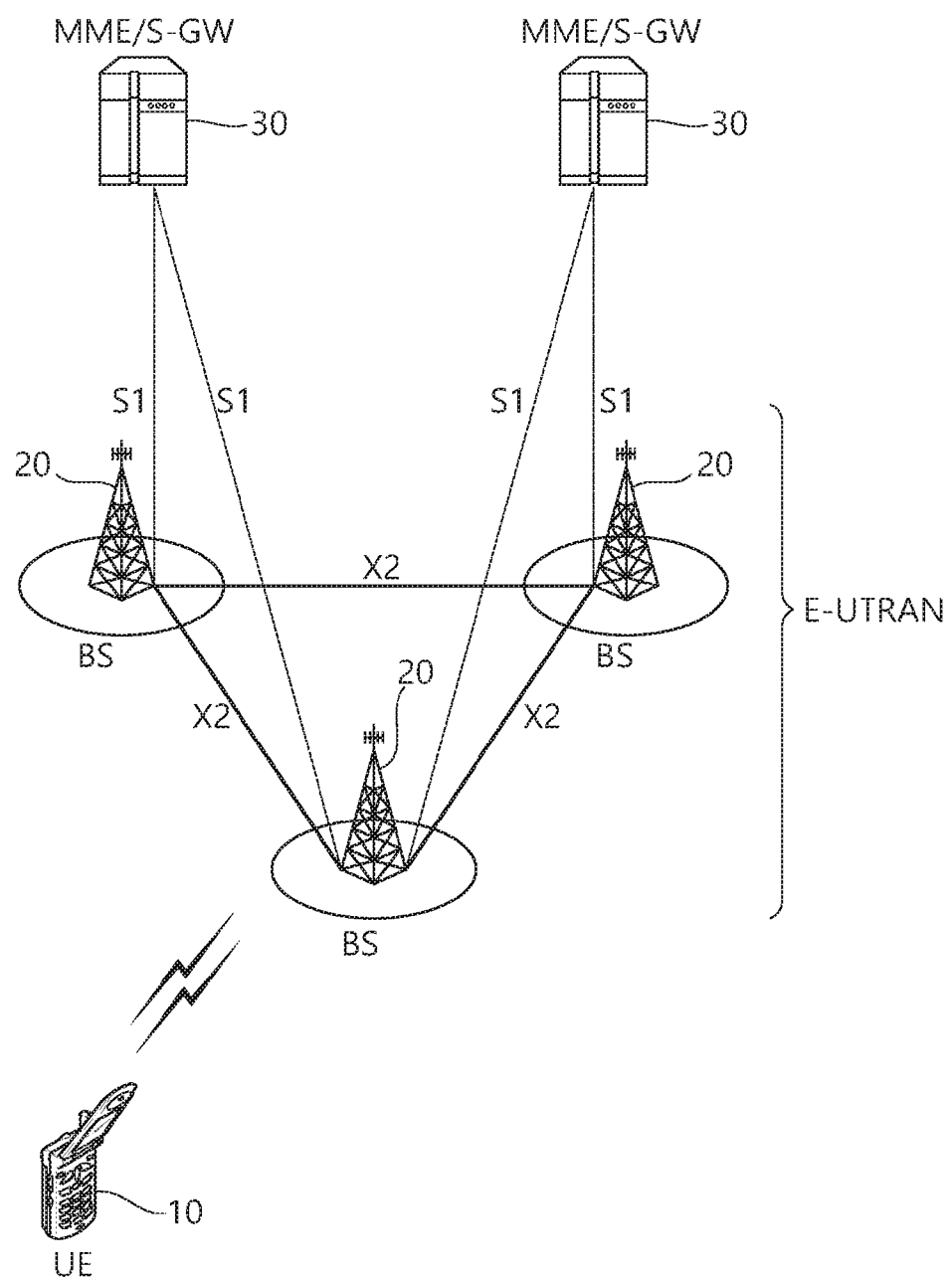
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Hereinafter, 5G network architecture is described.

Figure 2:
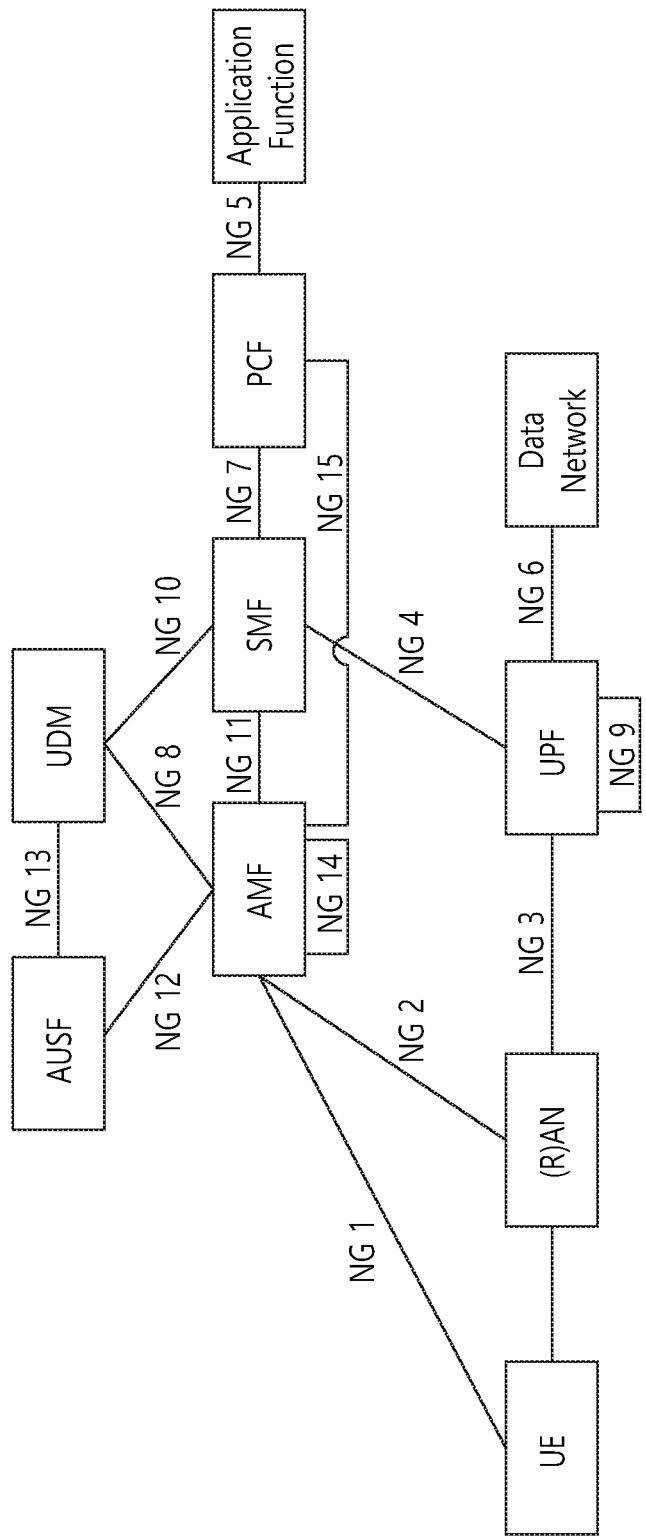
FIG. 2 shows 5G network architecture.

FIG. 2 shows 5G network architecture.

In an evolved packet core (EPC) which is the core network architecture of an existing evolved packet system (EPS), functions, reference points, protocols, and the like are defined by each entity, such as a mobility management entity (MME), a serving gateway (S-GW), a packet data network gateway (P-GW), and the like.

Referring to FIG. 2, in a 5G core network (or NextGen core network), functions, reference points, protocols, and the like are defined by each network function (NF). That is, in the 5G core network, functions, reference points, protocols, and the like are not defined by each entity.

A radio access network (RAN) may be a BS using a new RAT. In the present specification, a 5G RAN, an RAN, a BS, an RAN node, a gNB, a next-generation NodeB, a new RAN, and a new radio base station (NR BS) may refer to a BS newly defined for 5G. An AN may be a normal BS including a non-3GPP access technology, such as Wi-Fi.

A an NG2 reference point may be defined between an RAN (or AN) and an access and mobility function (AMF). An NG3 reference point may be defined between an RAN (or AN) and a user plane function (UPF). Control plane (CP) functions may include various functions to control a network and a UE. Typically, the CP functions may include an AMF in charge of a mobility management function and a session management function (SMF) in charge of a session management function. Since the AMF offers an independent function (that is, an access and mobility management function by each UE) for an access technology, each UE may basically be connected to one AMF. However, regarding the SMF, a different SMF per session may be allocated to a UE having a plurality of sessions.

An application function may provide information on packet flow to a policy control function (PCF) in charge of policy control in order to guarantee quality of service (QoS). The PCF may determine policies on session management and mobility management based on this information to transmit the policies to the AMF and the SMF, thus properly performing mobility management, session management, and QoS management.

A data network may transmit a protocol data unit (PDU) to be transmitted via a downlink to the UPF or may receive a PDU, which is sent from a UE, through the UPF. An NG6 reference point may be defined between the UPF and the data network.

The UPF may be configured using control signal information generated in the SMF, and an NG4 reference point may be defined for the UPF to report the state of the UPF to the SMF. An NG1 reference point may be defined between a UE and the AMF. An authentication server function (AUSF) may store data for the authentication of a UE, and a user data management (UDM) may store user subscription data, policy data, and the like.

Hereinafter, 5th-generation radio access network (5G RAN) deployment scenarios are described.

5G RAN deployment scenarios may be divided into a non-centralized deployment, a co-sited deployment with E-UTRA, and a centralized deployment according to forms of deploying BS functions in a central unit and a distributed unit or coexistence with a 4G BS. In the present specification, a 5G RAN, a gNB, a next-generation NodeB, a new RAN, and a new radio base station (NR BS) may refer to a BS newly defined for 5G. Further, basic functions supported by the 5G RAN may be defined in Table 1.

TABLE 1

| | Functional group similar to E-UTRAN |
|---|---|
| Functions similar to E-UTRAN | Synchronization, paging, connection, handover, load balancing, radio access network sharing, etc. |
| | First new RAN functional group |
| To support network slicing | Possible to support core network slicing of RAN |
| Tight interworking | Dual connectivity and data flow aggregation between 4 G and 5 G BSs |
| Multi-connectivity | To simultaneously connect one new RAN node and multiple new RAN nodes through data flow aggregation |
| To support multi-RAT handover | To support handover through new direct interface (xX) between eLTE eNB and gNB |
| | Second new RAN functional group |
| UE inactive mode | To enable immediate connection in occurrence of new traffic to UE when disconnected from radio access resource and connected to wired access (gNB-NGC) |
| Direct service | D2D improvement |
| Non-3GPP interworking | Interworking between non-3GPP (e.g., WLAN) and NR |
| To support inter-RAT handover through core | To support handover between E-UTRA and NR through core network |

Figure 3:
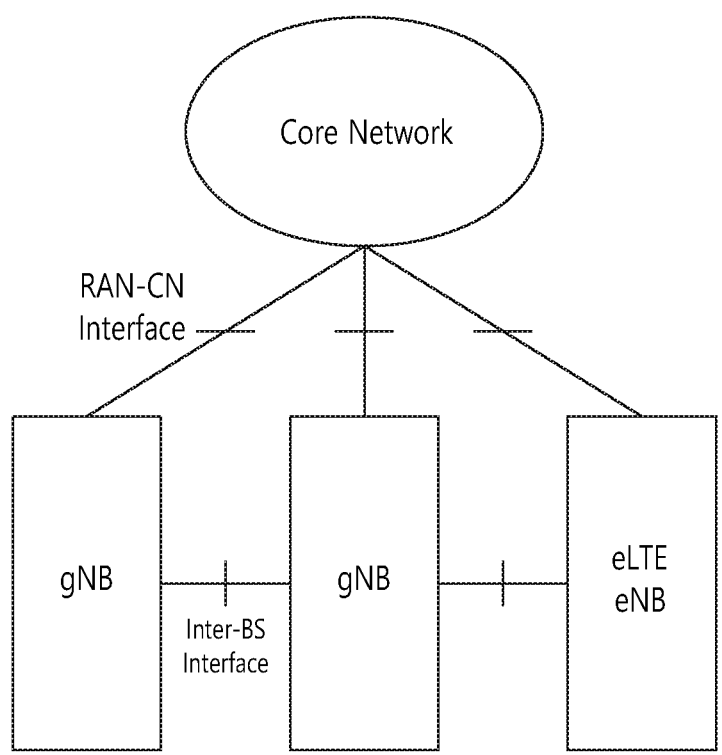
FIG. 3 illustrates a non-centralized deployment.

FIG. 3 illustrates a non-centralized deployment.

Referring to FIG. 3, gNBs may be horizontally configured, instead of being hierarchically separated into a central unit and a distributed unit. In this case, a full protocol stack may be supported at each gNB. The non-centralized deployment is suitable for a macrocell or indoor hotspot environment. A gNB may be connected directly to another gNB or eLTE eNB through an inter-BS interface. A gNB may be connected directly to a core network through an RAN-CN interface.

Figure 4:
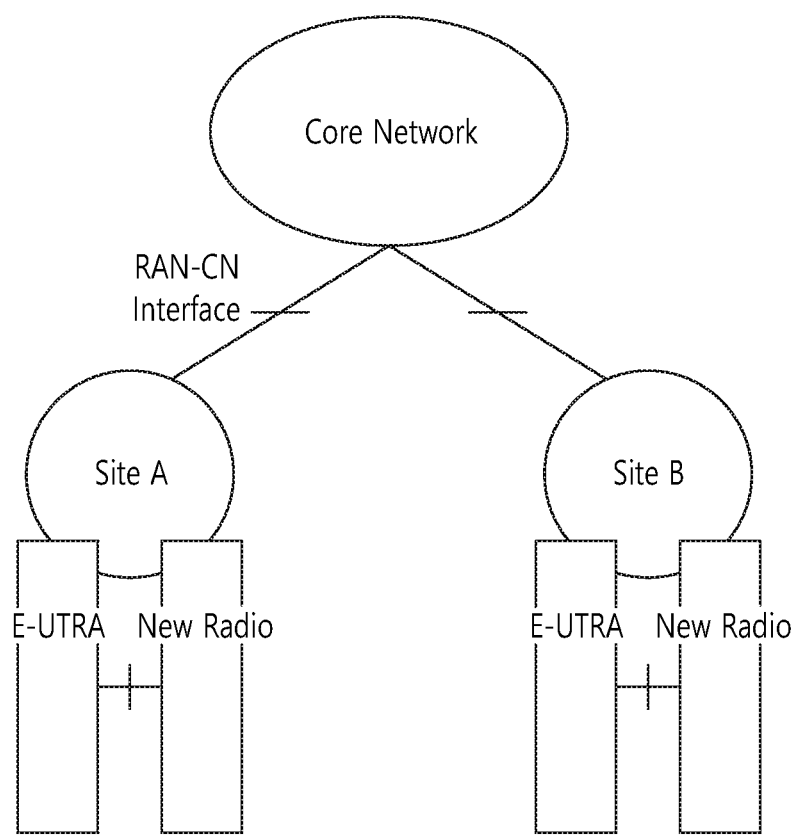
FIG. 4 illustrates a co-sited deployment with E-UTRA.

FIG. 4 illustrates a co-sited deployment with E-UTRA. Referring to FIG. 4, a 5G transmission mode (For example, new radio) and a 4G transmission mode (for example, E-UTRA) may be simultaneously used in one same spot. The co-sited deployment may be suitable for an urban macro-environment. In the co-sited deployment, it is possible to utilize all frequency resources assigned to 4G/5G by adjusting a BS configuration using load balancing and multi-connectivity and to extend cell coverage for cell-boundary users by using lower frequencies.

Figure 5:
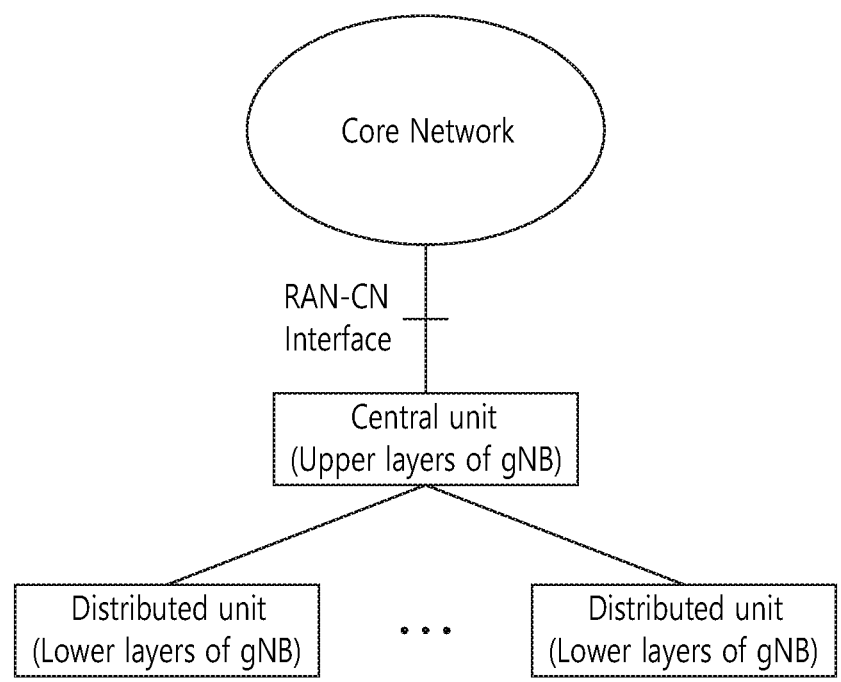
FIG. 5 illustrates a centralized deployment.

FIG. 5 illustrates a centralized deployment

Referring to FIG. 5, gNBs may be separated into a central unit and a distributed unit. That is, the gNBs may be hierarchically separated to operate. The central unit may perform the functions of upper layers of a BS, and the distributed unit may perform the functions of lower layers of a BS. The centralized deployment may be classified as a high-performance transport type or a low-performance transport type according to the transmission capacity and delay characteristics of a transport device connecting the central unit and the distributed unit.

In transport requiring high performance, the central unit accommodates a large number of functions of from an upper layer to a lower layer, whereas the distributed unit accommodates only a relatively small number of functions of some lower layer. Thus, the central unit may have a heavy processing load, and it may be difficult to meet the transmission capacity or delay and synchronization requirements of the transport device. For example, when most layers (RRC layer to physical layer) are deployed in the central unit and only an RF function is deployed in the distributed unit, it is estimated that the transmission band of the transport device is about 157 Gbps and the maximum delay thereof is about 250 us, and thus the transport device requires an optical network providing a high capacity and a low delay. However, since the transmission delay is short, coordinated communication (for example, CoMP) between BSs may be easily achieved by using an optimal scheduling technique.

In transport requiring low performance, since the central unit accommodates upper-layer protocol functions having a relatively low processing load, the transport device has a transmission capacity margin and a delay margin. For example, when only an upper layer (RRC layer) or above is deployed in the central unit and all of the other lower layers (PDCP layer to RF) are deployed in the distributed unit, it is estimated that the transmission band of the transport device is about 3 to 4 Gbps and the maximum delay thereof is about 10 ms, and thus the transport device has a transmission capacity margin and a delay margin as compared with in transport requiring high performance.

Hereinafter, network slicing is described.

Major differentiated features of a 5G system are flexibility and adaptability to network functions and services. One main concept to achieve the flexibility is network slicing. Network slice makes it possible to efficiently support various demands for a network.

Network slicing means dividing one physical network into a plurality of logical networks having specified network functions to provide various services of heterogeneous characteristics. Here, isolation between different network slices may be required so that a service provided by one network slice does not affect a service provided by another network slice.

In general, a service for a user may be provided by one network slice operated by a network operator. However, a specified user may access one or more network slices at the same time in order to utilize services of various characteristics, such as mobile broad band (MBB), critical communication, and the like. When the specified user attempts to access one or more network slices at the same time, the network operator needs to ensure that no signaling procedures overlap.

Figure 6:
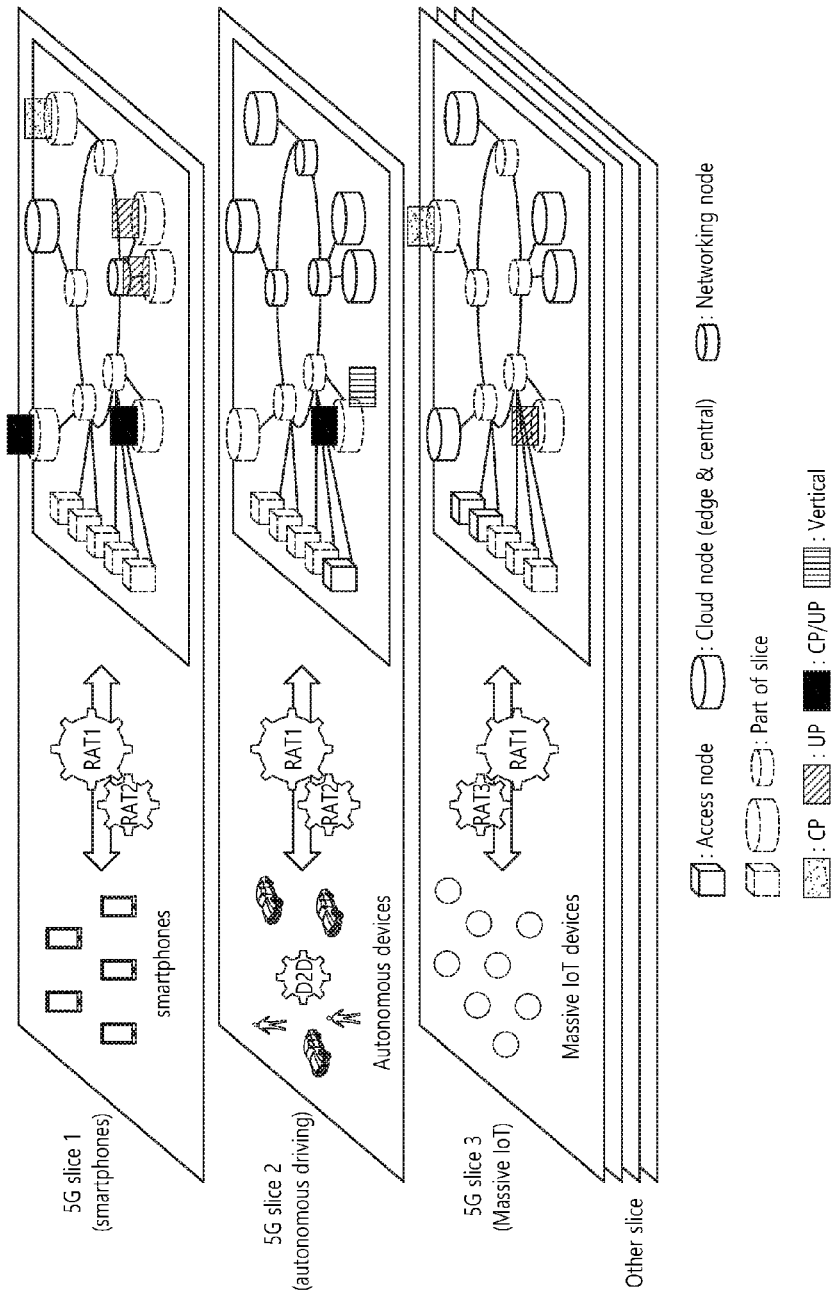
FIG. 6 illustrates an example of network slicing.

FIG. 6 illustrates an example of network slicing.

Referring to FIG. 6, one physical network may be sliced into logical networks, such as slice 1 for supporting a smartphone, slice 2 for supporting autonomous driving, slice 3 for supporting massive Internet of Things (IoT), and other slices for supporting other services. Thus, for example, if the network receives a request for an autonomous driving service, slice 2 may be selected.

Each slice is ensured a resource (for example, a resource in a virtualized server and a virtualized network resource). Further, since the slices are isolated from each other, an error or a failure occurring in a particular slice does not affect communication in another slice. For example, even if a failure occurs in slice 1 for supporting the smartphone, since the failure occurring in slice 1 does not affect the other slices, the autonomous driving service and a massive IoT service can be normally performed.

Figure 7:
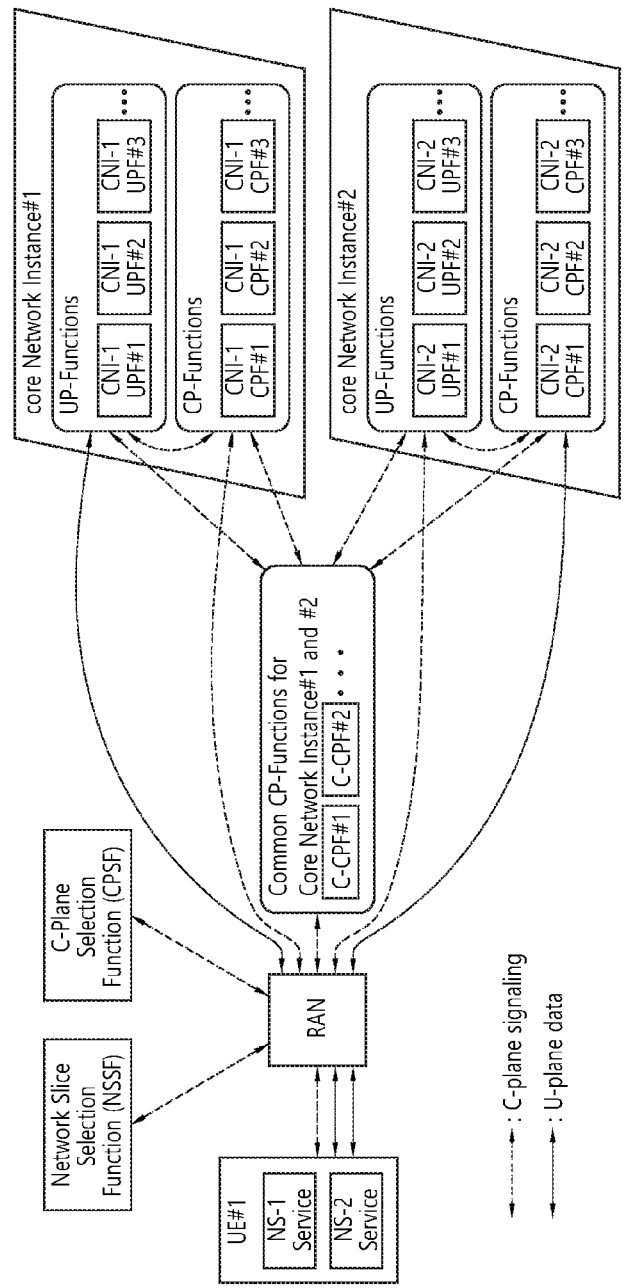
FIG. 7 shows an example of sharing a set of common C-plane functions among multiples core network instances.

FIG. 7 shows an example of sharing a set of common C-plane functions among multiples core network instances. The principles of the solution shown in FIG. 7 are as follows:

A core network instance consists of a single set of C-Plane functions and a single set of U-Plane functions.

A core network instance is dedicated for the UEs that are belonging to the same UE type. Identifying the UE type is done by using a specific parameter, e.g. the UE usage type, and/or an information from the UE's subscription.

A set of C-Plane functions is responsible, for example, for supporting UE mobility if demanded or for admitting the UE into the network by performing authentication and subscription verification.

All C-Plane functions that are common to multiple core network instances, are not necessary to be created multiple times.

Other C-Plane functions that are not in common with other core network instances are only used by its own core network instance.

A set of U-Plane functions in a core network instance is responsible for providing a specific service to the UE and for transports the U-Plane data of the specific service. For example, one set of U-Plane functions in core network instance #1 provides an enhanced mobile broadband service to the UE, whereas another set of U-Plane functions in core network instance #2 provides a critical communication service to the UE.

Each UE can have multiple U-Plane connections to different sets of U-Plane function that are available at different core network instances simultaneously.

The network slice selection function (NSSF) is responsible for selecting which core network instance to accommodate the UE by taking into account the UE's subscription and the specific parameter, e.g. the UE usage type.

The C-Plane selection function (CPSF) is responsible for selecting which C-Plane functions within the selected core network instance that the base station should communicate with. This selection of C-Plane functions is done by using the specific parameter, e.g. UE usage type.

Figure 8:
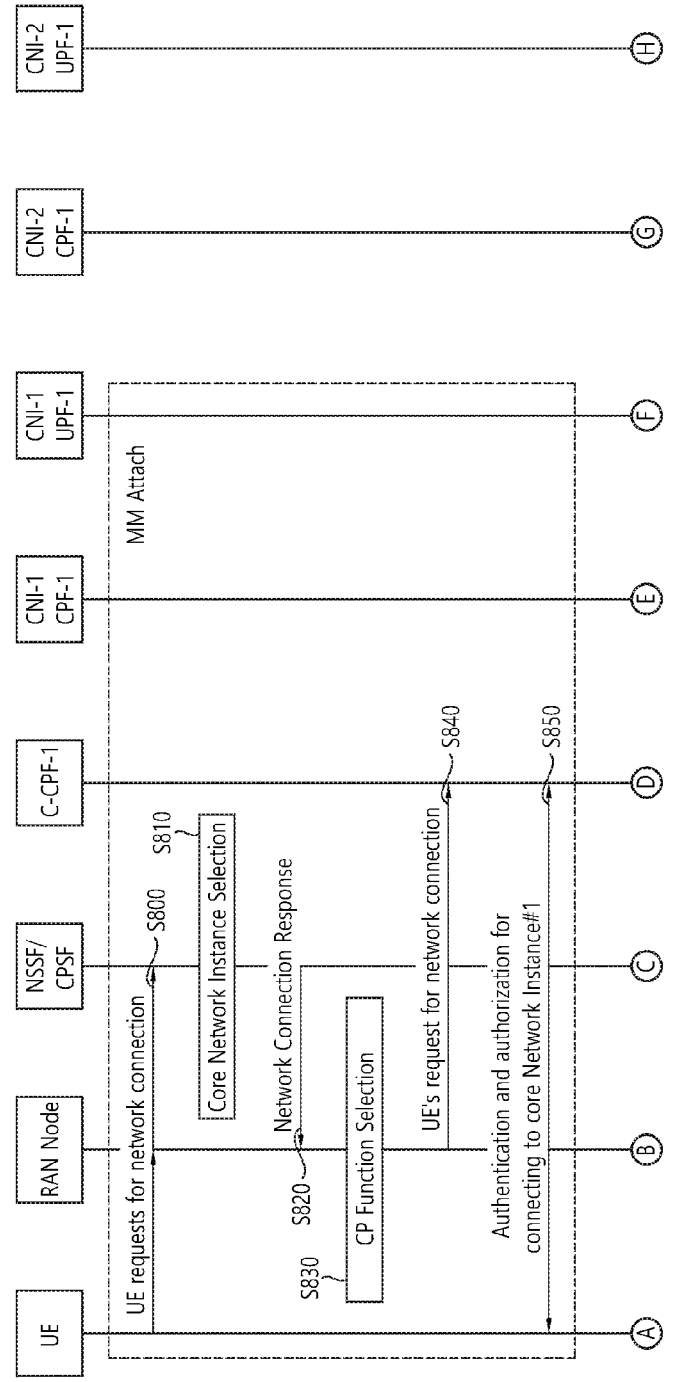
FIG. 8 and FIG. 9 show an example of signaling flow for supporting connections with multiple core network instances.
Figure 9:
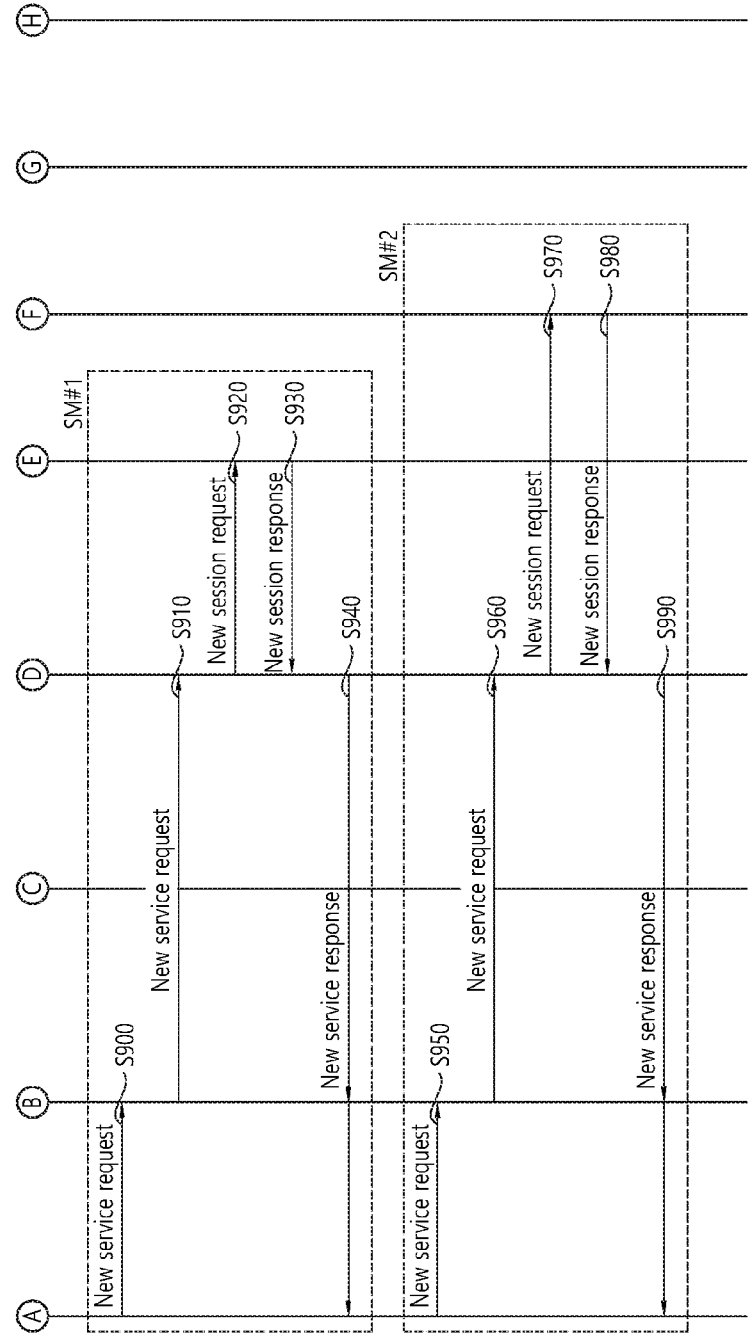

FIG. 8 and FIG. 9 show an example of signaling flow for supporting connections with multiple core network instances. FIG. 8 shows a mobility management (MM) attach procedure. FIG. 9 shows a session management (SM) procedure. The MM attach procedure shown in FIG. 8 is followed by the SM procedure shown in FIG. 9. In FIG. 8 and FIG. 9, a common C-Plane function (C-CPF) may be called other names, e.g. access and mobility management function (AMF). The CPF in the core network instance (i.e. CNI-1 CPF-1 or CNI-2 CPF-1) may be called other name, e.g. session management function (SMF).

Referring to FIG. 8, in step S800, when a UE first connects to the operator's network, the UE sends a network connection request to the RAN node. The RAN node may be a gNB, which may have the similar functions as the eNB in LTE. If the UE provides enough information to the RAN node to route the message to the appropriate core network instance and its corresponding C-Plane function, the RAN node routes this request to this C-Plane function. Hence, the flow continues in step S830 which will be described below. Otherwise, the RAN node forwards it to the NSSF/CPSF, and the flow continues in step S810.

In step S810, the NSSF/CPSF determines which core network instance and its corresponding C-Plane function(s) to be connected to by taking into account information in the request from a UE in step S800. In addition, other information from the subscription database may be also considered. In FIG. 8, this is the core network instance #1.

In step S820, the NSSF/CPSF sends a response to the RAN node with the C-Plane function(s) of the selected core network instance #1.

In step S830, based on the response sent in step S820, the RAN node selects a C-Plane function of the selected core network instance #1.

In step S840, the RAN node forwards the UE's network connection request to this C-CPF-1, which was the selected C-Plane function from steps S820 and S830.

In step S850, authentication and admitting the UE into the core network instance #1 is performed.

Referring to FIG. 9, which follows the FIG. 8, in step S900, the UE requests for a communication service (e.g. service #1 that is provided by the core network instance #1).

In step S910, the RAN node forwards the request for service to the C-CPF-1.

In step S920, the C-CPF-1 selects C-Plane function of the core network instance #1 and forwards the UE's request for the service#1 to this CPF-1 in core network instance #1 (i.e. CNI-1 CPF-1).

In step S930, after a successful session establishment, the CPF-1 in core network instance #1 sends the session response back to C-CPF-1.

In step S940, the C-CPF-1 sends a new service response back to the UE via the RAN node.

In step S950, the UE requests for a new communication service that is of a different service type than the previous service.

In step S960, the RAN node forwards the request for new communication service to the C-CPF-1.

In step S970, the C-CPF-1 selects C-Plane function of the core network instance #2 and forwards the UE's request for the new service to this CPF-1 in core network instance #2 (i.e. CNI-2 CPF-1).

In step S980, after a successful session establishment, the CPF-1 in core network instance #2 sends the session response back to C-CPF-1.

In step S990, the C-CPF-1 sends a new service response back to the UE via the RAN node.

When a UE requests a particular network slice for use to a network, the network needs to determine whether to approve the network slice that the UE has requested for use. However, referring to FIGS. 7 to 9, when an MM attach procedure is performed, the network is unable to approve or disapprove the network slice the UE has requested for use. Therefore, it is necessary to propose a novel procedure for approving a network slice requested for use by the UE in the MM procedure. Hereinafter, a method for a BS to receive authorization information for a network slice and an apparatus supporting the same will be described according to an embodiment of the present invention.

Figure 10:
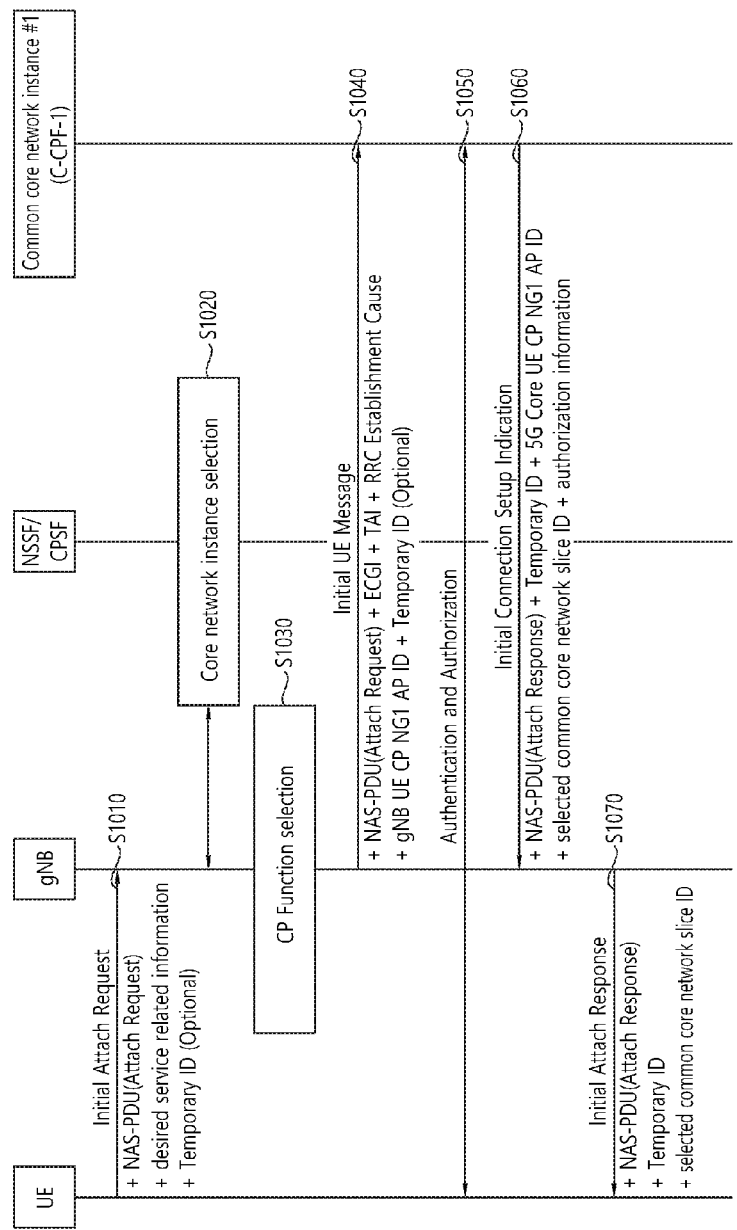
FIG. 10 illustrates an initial mobility management (MM) attach procedure according to an embodiment of the present invention.

FIG. 10 illustrates an initial mobility management (MM) attach procedure according to an embodiment of the present invention.

Referring to FIG. 10, in step S1010, a UE may initiate an MM attach. The UE may transmit an attach request to a BS. The BS may be a gNB.

In addition, information on a service desired by the UE may be transmitted to the BS. Further, when the UE has a temporary identity (ID) IE, the temporary ID IE may be transmitted to the BS. The temporary ID IE may be defined similar to an SAE-temporary mobile subscriber identity (S-TMSI) of LTE. That is, the temporary ID may include information on a common control plane function (C-CPF). In this specification, a common control plane function, a common core network instance, a common control plane function for a core network instance, a common core network slice, a common control plane function for a core network slice, a network slice, and an access and mobility management function (AMF) may be used to refer to the same concept.

In step S1020, the BS may assign a unique ID to be used for the UE. The unique ID assigned by the BS may be referred to as a gNB UE CP NG1AP ID. For example, the gNB UE CP NG1AP ID may be similar to an eNB UE S1AP ID defined in section 9.2.3.4 of 3GPP TS 36.413 V12.6.0 (2015-06). The eNB UE S1AP ID may uniquely identify a UE association through an S1 interface in an eNB. Thus, the gNB UE CP NG1AP ID may uniquely identify a UE association through an NG1 interface in the gNB.

When the BS receives the temporary ID IE from the UE, the BS may forward the received attach request received in step S1010 to the common control plane function indicated by the temporary ID IE. Accordingly, step S1020, in which the NSSF selects a network slice, and step S1030, which will be described below, may be omitted.

Additionally, the BS may request the NSSF and a CPSF to determine which slice the attach request from the UE needs to be delivered to. When the BS receives no temporary ID IE from the UE, the BS may request the NSSF and the CPSF to determine which slice the attach request from the UE is to be delivered to. Alternatively, even though the BS receives the temporary ID IE from the UE, when the temporary ID IE is not sufficient for the BS to select the common control plane function, the BS may request the NSSF and the CPSF to determine which slice the attach request from the UE is to be delivered to. In order for the NSSF and the CPSF to select an appropriate slice for the UE, the BS may transmit information received from the UE to the NSSF and the CPSF. For example, the information received from the UE may be a UE service type (that is, the type of a service desired by the UE). Other pieces of information from a subscription database may be considered in the NSSF and CPSF. Based on the information from the UE and the database, the NSSF may determine a common core network instance for the UE and may transmit the ID of a selected slice to the BS. For example, in FIG. 10, the NSSF may determine common core network instance #1 for the UE and may transmit the ID of core network instance #1 to the BS.

In step S1030, based on the information provided by the NSSF (or a response from the NSSF), the BS may select a common core network instance and a corresponding common control plane function thereof to deliver the attach request from the UE. That is, the BS may select the common control plane function of the selected common core network instance. For example, in FIG. 10, the BS may select C-CPF-1 to deliver the attach request from the UE. When the BS receives the temporary ID IE from the UE in step S1010, step S1030 may be omitted.

In step S1040, to deliver the attach request from the UE, the BS may send a message to the common control plane function of the common core network instance selected in step S1030. For example, the BS may send a message to C-CPF-1 selected in step S1030. The message may be an initial UE message or a new message.

The message may include the ID (for example, ECGI in LTE) of a cell in which the UE transmits an NAS message and a tracking area identity (TAI). Further, the message may include an NAS-PDU IE including the attach request. Additionally, the message may include a gNB UE CP NG1AP ID IE. Moreover, the message may include an RRC establishment cause IE. When the BS receives the temporary ID from the UE, the temporary ID may be transmitted to the selected common core network instance.

Upon receiving the gNB UE CP NG1AP ID IE from the BS, the common core network instance may assign a unique ID to be used for the UE. The unique ID assigned by the common core network instance may be referred to as a 5G Core UE CP NG1AP ID. The 5G Core UE CP NG1AP ID may uniquely identify a UE association through an NG1 interface within a 5G core.

In step S1050, authorization and authentication for the UE may be performed.

In step S1060, the selected common control plane function (that is, C-CPF-1) may identify whether the use of a network slice requested by the UE is authorized. Whether the use of the network slice requested by the UE is authorized may be identified based on at least one of subscription data or UE capability. The selected common control plane function may transmit authorization information on the requested network slice to the BS. The authorization information may indicate whether the use of the requested network slice is authorized. The authorization information may be transmitted to the BS via an initial connection setup indication message or a new message.

The initial connection setup indication message or the new message may include an ID of the network slice selected by the NSSF, a 5G Core UE CP NG1AP ID IE, and an NAS-PDU IE including an attach response. When no temporary ID IE is received from the UE during the MME attach procedure, the common core network instance may assign a value for identifying UE context in the network. Further, the common core network instance may deliver the assigned value to the UE.

In step S1070, when the BS receives the authorization information from the selected common control plane function, the BS needs to store the received authorization information on the network slice in the UE context. In addition, if the BS receives the attach response from the selected common control plane function, the BS may deliver the received attach response to the UE. Furthermore, when the BS receives the 5G Core UE CP NG1AP ID IE from the selected common control plane function, the BS may establish a UE-associated logical NG1-connection. The UE-associated logical NG1 connection may be a reference point between the UE and the selected common control plane function.

Figure 11:
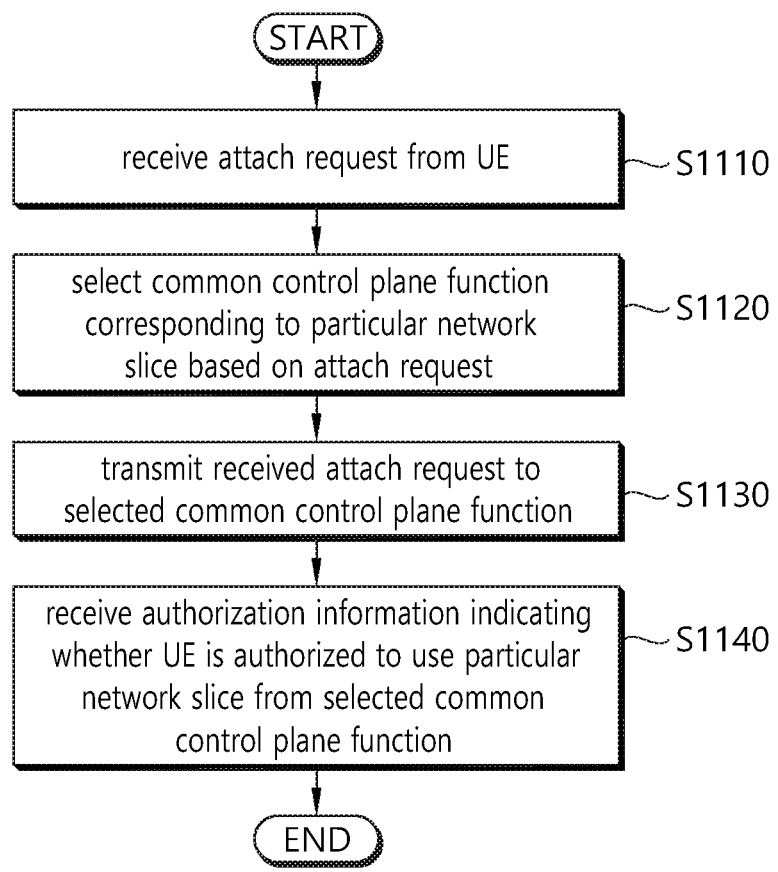
FIG. 11 is a block diagram illustrating a method for a base station (BS) to receive authorization information on a network slice according to an embodiment of the present invention.

FIG. 11 is a block diagram illustrating a method for a BS to receive authorization information on a network slice according to an embodiment of the present invention.

Referring to FIG. 11, in step S1110, the BS may receive an attach request from a UE.

The attach request may include information on a service desired by the UE. The particular network slice may be determined by a network slice selection function (NSSF) based on the information on the service desired by the UE. The particular network slice may be a network slice providing the service desired by the UE.

In step S1120, the BS may select a common control plane function (common CP-function) corresponding to the particular network slice based on the attach request.

The common control plane function corresponding to the particular network slice may be selected by the NSSF and a control plane selection function (CPSF). The NSSF and the CPSF may be included in the BS.

The common control plane function may be an access and mobility function (AMF).

In step S1130, the BS may transmit the received attach request to the selected common control plane function.

In step S1140, the BS may receive authorization information indicating whether the UE is authorized to use the particular network slice from the selected common control plane function.

Whether the UE is authorized to use the particular network slice may be determined by the selected common control plane function. Whether the UE is authorized to use the particular network slice may be determined based on subscription data or a capability of the terminal.

Further, the BS may store the received authorization information in UE context.

Further, the BS may receive an indicator indicating whether the attach request is allowed from the selected common control plane function. Additionally, the BS may send the indicator indicating whether the attach request is allowed to the UE.

According to an embodiment of the present invention, a common control plane function for a core network instance may transmit authorization information indicating whether a network slice requested by a UE is authorized to a BS. Further, the authorization information may be transmitted during an MM procedure. Thus, when an MM attach procedure is performed for a specific service, such as enhanced mobile broadband (eMBB) or massive machine-type communication (mMTC) services, the BS may identify whether a network slice requested by the UE is authorized by the common control plane function.

Figure 12:
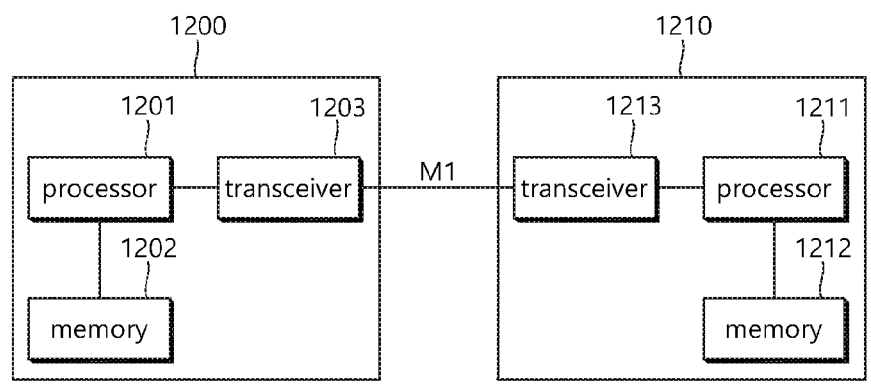
FIG. 12 is a block diagram illustrating a wireless communication system according to the embodiment of the present invention

FIG. 12 is a block diagram illustrating a wireless communication system according to the embodiment of the present invention.

A BS 1200 includes a processor 1201, a memory 1202 and a transceiver 1203. The memory 1202 is connected to the processor 1201, and stores various information for driving the processor 1201. The transceiver 1203 is connected to the processor 1201, and transmits and/or receives radio signals. The processor 1201 implements proposed functions, processes and/or methods. In the above embodiment, an operation of the base station may be implemented by the processor 1201.

An LME 1210 includes a processor 1211, a memory 1212 and a transceiver 1213. The memory 1212 is connected to the processor 1211, and stores various information for driving the processor 1211. The transceiver 1213 is connected to the processor 1211, and transmits and/or receives radio signals. The processor 1211 implements proposed functions, processes and/or methods. In the above embodiment, an operation of the LME may be implemented by the processor 1211.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for receiving, by a base station (BS), authorization information on a network slice in a wireless communication system, the method comprising:
receiving an attach request from a user equipment (UE);
if the attach request includes a temporary identity (ID) indicating a common control plane function (C-CPF) corresponding to a particular network slice, transmitting the received attach request including the temporary ID to the indicated C-CPF corresponding to the particular network slice;
if the attach request does not include the temporary ID indicating the C-CPF:
selecting a C-CPF corresponding to a particular network slice based on the attach request; and
transmitting the received attach request to the selected C-CPF; and
receiving authorization information, which indicates whether the UE is authorized to use the particular network slice, from the indicated or selected C-CPF.

2. The method of claim 1, further comprising:
storing the received authorization information in UE context.

3. The method of claim 1, wherein whether the UE is authorized to use the particular network slice is determined by the selected C-CPF when the attach request does not include the temporary ID indicating the C-CPF.

4. The method of claim 3, wherein whether the UE is authorized to use the particular network slice is determined based on subscription data or a capability of the UE.

5. The method of claim 1, wherein the C-CPF corresponding to the particular network slice is selected by a network slice selection function (NSSF) and a control plane selection function (CPSF) when the attach request does not include the temporary ID indicating the C-CPF.

6. The method of claim 5, wherein the NSSF and the CPSF are comprised in the BS.

7. The method of claim 1, wherein the attach request comprises information on a service desired by the UE.

8. The method of claim 7, wherein the particular network slice is determined by an NFFS based on the information on the service desired by the UE.

9. The method of claim 8, wherein the particular network slice is a network slice providing the service desired by the UE.

10. The method of claim 1, further comprising:
receiving an indicator indicating whether the attach request is allowed from the selected C-CPF.

11. The method of claim 10, further comprising:
transmitting the indicator indicating whether the attach request is allowed to the UE.

12. The method of claim 1, wherein the C-CPF is an access and mobility function (AMF).

13. A base station (BS) receiving authorization information on a network slice in a wireless communication system, the BS comprising:
a memory;
a transceiver; and
a processor, coupled to the memory and the transceiver, that:
controls the transceiver to receive an attach request from a user equipment (UE);
if the attach request includes a temporary identity (ID) indicating a common control plane function (C-CPF) corresponding to a particular network slice, controls the transceiver to transmit the received attach request including the temporary ID to the indicated C-CPF corresponding to the particular network slice;
if the attach request does not include the temporary ID indicating the C-CPF:
selects a C-CPF corresponding to a particular network slice based on the attach request; and
controls the transceiver to transmit the received attach request to the selected C-CPF; and
controls the transceiver to receive authorization information, which indicates whether the UE is authorized to use the particular network slice, from the indicated or selected C-CPF.

14. The BS of claim 13, wherein the processor stores the received authorization information in UE context.

15. The BS of claim 13, wherein whether the UE is authorized to use the particular network slice is determined by the selected C-CPF when the attach request does not include the temporary ID indicating the C-CPF.

* * * * *